US00RE43535E

(19) United States
(12) Reissued Patent
Roll

(10) Patent Number: US RE43,535 E
(45) Date of Reissued Patent: Jul. 24, 2012

(54) SWIVEL JACK ASSEMBLY

(75) Inventor: Michael John Roll, Wausau, WI (US)

(73) Assignee: Cequent Performance Products, Inc., Plymouth, MI (US)

(21) Appl. No.: 10/682,851

(22) Filed: Oct. 8, 2003

Related U.S. Patent Documents

Reissue of:
(64) Patent No.: 6,302,381
Issued: Oct. 16, 2001
Appl. No.: 09/398,619
Filed: Sep. 17, 1999

U.S. Applications:
(60) Provisional application No. 60/128,679, filed on Apr. 9, 1999.

(51) Int. Cl.
*B60S 9/08* (2006.01)

(52) U.S. Cl. ..... 254/425; 254/418; 254/424

(58) Field of Classification Search ..... 254/418, 254/420–425; 248/674, 200.1, 291, 284, 248/286; 403/96, 92
See application file for complete search history.

(56) References Cited

U.S. PATENT DOCUMENTS

| | | | | |
|---|---|---|---|---|
| 3,595,527 | A | 7/1971 | Douglass | |
| 3,830,580 | A | 8/1974 | Slattery et al. | |
| 3,841,663 | A | 10/1974 | Proffit | |
| 3,851,855 | A | 12/1974 | Douglass | |
| 3,863,894 | A | 2/1975 | Mansi et al. | |
| 3,921,958 | A | 11/1975 | Brockelsby et al. | |
| 3,944,259 | A | 3/1976 | Miller | |
| 3,997,191 | A | 12/1976 | Morgan | |
| 4,169,579 | A | 10/1979 | Moll | |
| 4,283,073 | A | 8/1981 | Gostomski et al. | |
| 4,352,505 | A | 10/1982 | Chambers | |
| 4,623,125 | A | 11/1986 | Ebey | |
| 4,763,917 | A | 8/1988 | Chambers | |
| D298,676 | S | 11/1988 | Chambers | |
| D304,818 | S | 11/1989 | Chambers | |
| 4,889,357 | A | 12/1989 | Perry | |
| 5,009,445 | A | 4/1991 | Williams, Jr. | |
| 5,011,119 | A | 4/1991 | Harrington | |
| 5,067,692 | A * | 11/1991 | Nudd et al. | 254/420 |
| 5,282,605 | A | 2/1994 | Sauber | |
| 5,435,523 | A | 7/1995 | Hying et al. | |
| 6,302,381 | B1 * | 10/2001 | Roll | 254/425 |

* cited by examiner

*Primary Examiner* — Lee D Wilson
(74) *Attorney, Agent, or Firm* — McDonald Hopkins LLC

(57) ABSTRACT

The swivel jack assembly is used with trailers to vertically position a trailer tongue for mounting onto a hitch of the towing vehicle. The swivel jack assembly includes a jack-mounting bracket welded to an outer housing of the jack, and a tongue-mounting bracket mounted onto the tongue portion of a trailer. The jack also includes a novel swivel mechanism for pivoting the mechanism in either an upright support position or a horizontal stowed position. A cup-shaped section of the jack-mounting bracket nests within a cup-shaped section of the tongue-mounting bracket. When in the upright position, the jack extends vertically and may be used to raise or lower the tongue and support the trailer. The swivel jack assembly keeps the trailer in a level position when the trailer is disengaged from the towing vehicle. The swivel jack assembly is pivotally mounted onto the trailer tongue such that they can be pivotally repositioned to a stowed position when not in use.

25 Claims, 3 Drawing Sheets

Amended

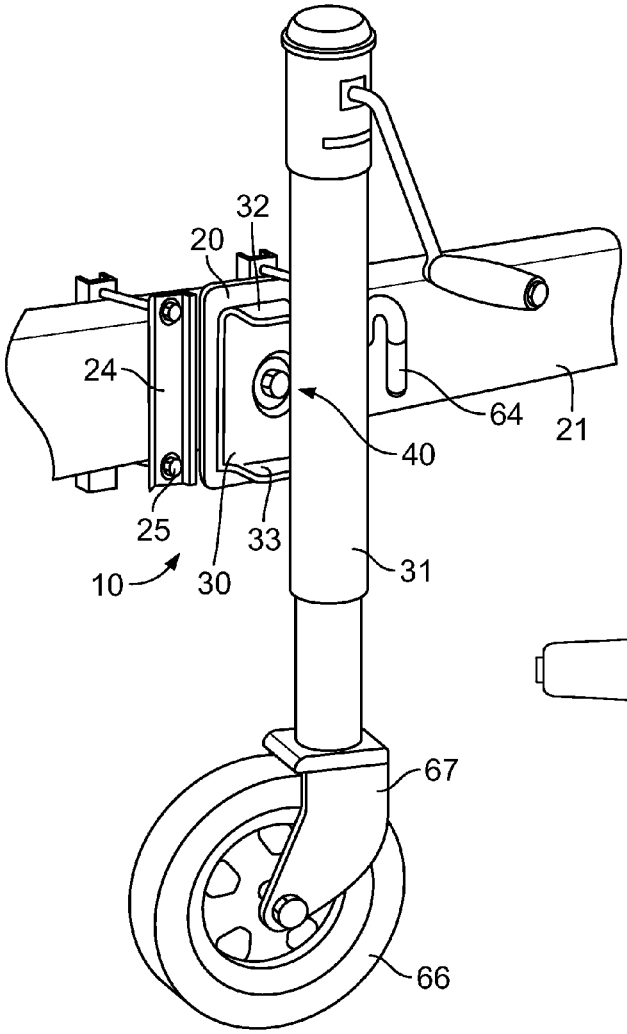
FIG. 1
Amended
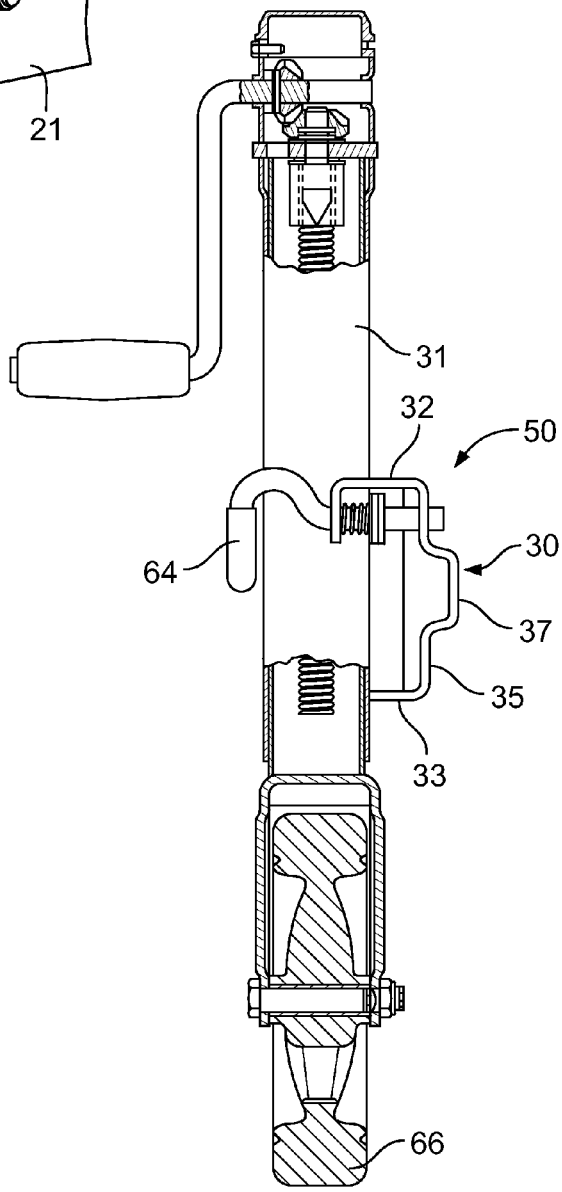
FIG. 3
Amended

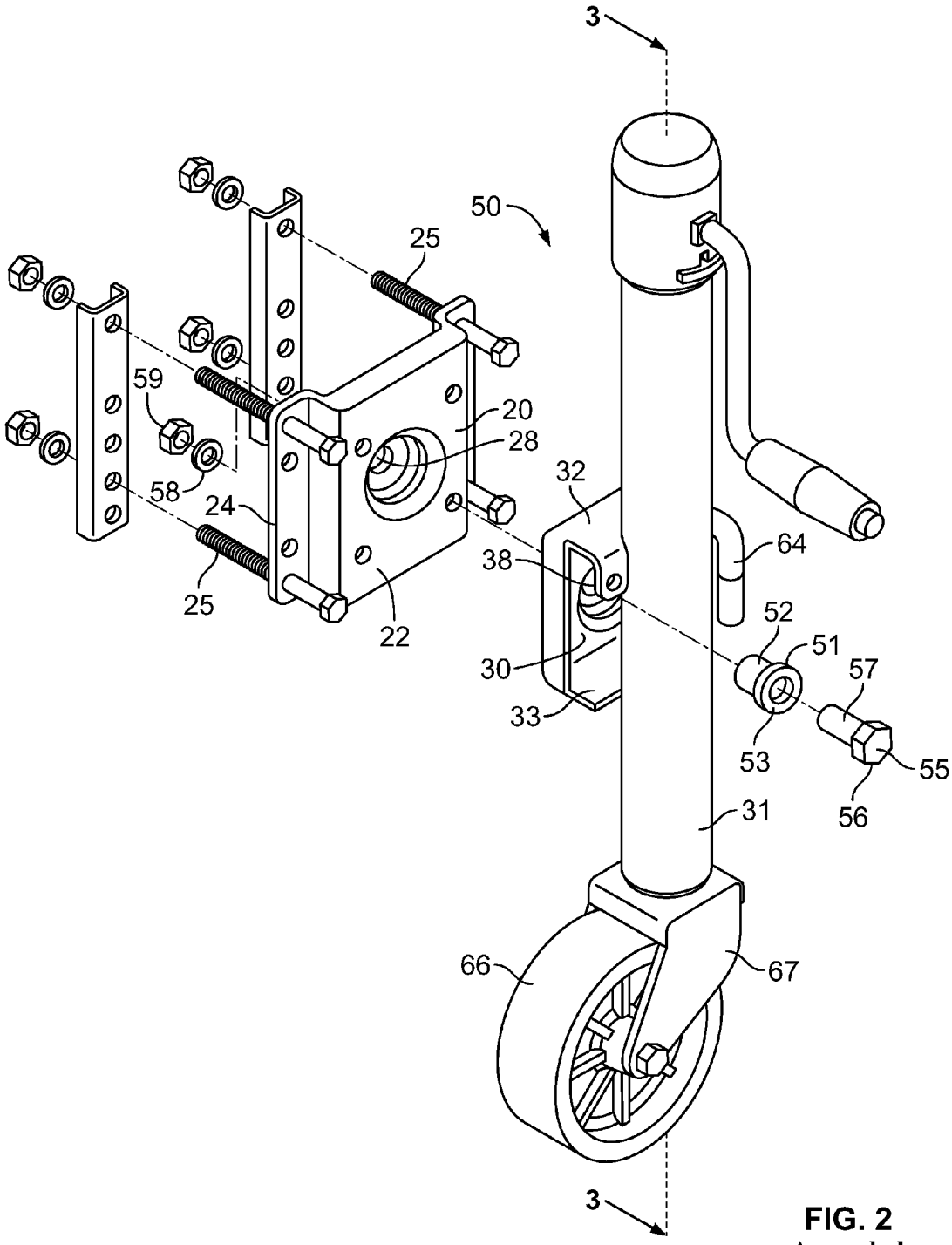
FIG. 2
Amended

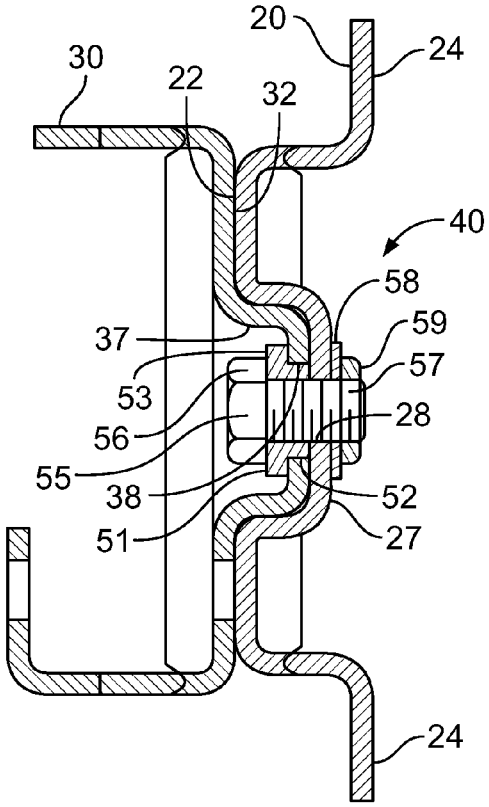
FIG. 4A
Amended
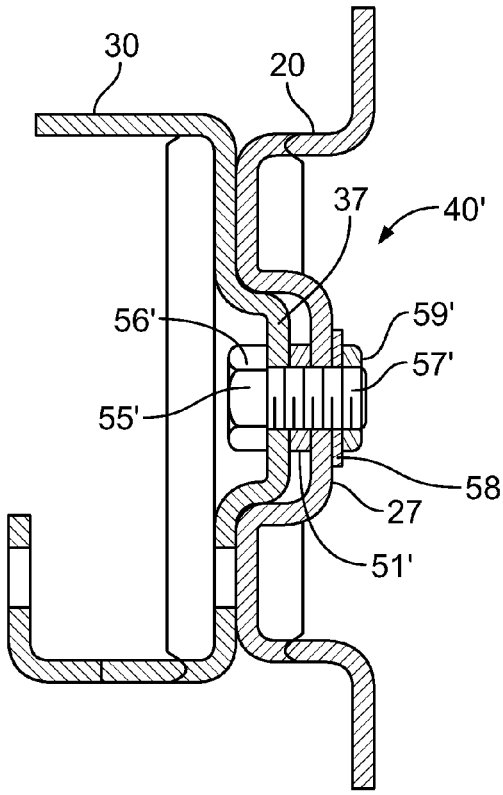
FIG. 4B
Amended

SWIVEL JACK ASSEMBLY

Matter enclosed in heavy brackets [ ] appears in the original patent but forms no part of this reissue specification; matter printed in italics indicates the additions made by reissue.

RELATED APPLICATIONS

This application claims priority from U.S. Provisional Application No. 60/128,679 filed on Apr. 9, 1999.

FIELD OF ART

This invention relates to jacks for pivotally mounting to and towing recreational vehicles such as trailers and boats, and more particularly, to a swivel jack for vertically repositioning a trailer tongue relative to a towing vehicle.

BACKGROUND

Support jacks have long been used to keep the trailer in a level position when the trailer is disengaged from the towing vehicle. Also, the support jack vertically repositions the trailer tongue so that it can be mounted onto a hitch of the towing vehicle. Oftentimes, these jacks are pivotally mounted onto the trailer tongue such that they can be pivotally moved to a horizontally stored position when not in use.

Various types of such trailer mechanisms are known in the art.

U.S. Pat. No. 4,623,125 (Ebey) discloses a swivel jack with two brackets. The first bracket is affixed to a jack housing and the second bracket is affixed to a trailer tongue. One of the brackets has a section that interlocks and slidably receives a lug extending from the other bracket. A second lug extends from one of the brackets and is slidably received through a notch in the other of the brackets. The second lug disengages from the notch and enables the first bracket to pivot about an axis extending through the first lug to a stored position. A lock mechanism selectively retains the first bracket in the stored position.

U.S. Pat. No. 5,067,692 (Nudd, et al.) discloses another swivel jack assembly for use with a trailer tongue. A spacer is disposed between the tongue and housing brackets. The spacer includes clamping components which are assembled from the inner side of the tongue bracket. The swivel jack assembly includes a first bracket secured to the trailer tongue and a second bracket secured to the jack housing. A bolt extending through the housing bracket and the spacer enables the housing bracket to pivot relative to the tongue between an active position and a stowed position. In the active position, the jack extends vertically and is used to raise and lower the tongue. Once the tongue is coupled to the towing vehicle, the jack may be pivoted and moved to a stowed position alongside the tongue.

U.S. Pat. No. 5,282,605 (Sauber) discloses a pivotally rotatable trailer jack assembly. A horizontally disposed support member connects the jack to the trailer frame. A cylindrical bore in the support member receives a horizontally disposed sleeve rotatably fitted and axially restrained within the support member. A slidable latch selectively prevents the rotation of the sleeve within the bore. The jack is fixedly attached centrally to the outer end of the sleeve whereby the rotation of the sleeve within the bore defines a first jack upright position and second jack stowed position. The latch maintains both the jack positions. The latch is a slidable U-shaped plate having a handle portion at its top and which fits between the tubular outer member and the inner sleeve having a rectangular cross section.

While these swivel jack assemblies provide significant advantages over their prior art, a rotatable support arrangement for the trailer jack is needed that retains the jack firmly against the mounting bracket, that has a minimum amount of unwanted movement or excess pivoting when directed loads are applied, that minimizes any wobbling and eliminates any clatter during transport, and that reduces the likelihood of damage to the rest end during transport.

What is needed is enhanced bracketry, a swivel jack assembly that is easy to operate, that is economical to manufacture, that has but a few moving parts, that minimizes the time and effort to raise the jack rest end for transport. These and other advantages of the swivel jack assembly of the present invention will be readily apparent from the following detailed description.

SUMMARY OF THE INVENTION

The swivel jack assembly of the present invention includes a tongue-mounting bracket that is secured to the trailer tongue and a jack-mounting bracket that is secured to the jack housing. The swivel jack raises and lowers the trailer tongue to facilitate hitching of the trailer tongue to a towing vehicle. The swivel jack assembly of the present invention is intended primarily for use with recreational vehicles such as boat and house trailers.

The preferred embodiment of the swivel jack assembly of the present invention comprises a tongue-mounting bracket, a jack-mounting bracket, a swivel connection, and a locking mechanism.

The jack-mounting bracket is affixed to the housing of a jack and the tongue-mounting bracket is affixed to the trailer tongue. The swivel jack assembly vertically positions a trailer tongue for mounting onto a hitch of the towing vehicle. The tongue-mounting bracket enables locking engagement onto a trailer tongue. The jack-mounting bracket enables locking engagement with a jack, the jack-mounting bracket including means for locking attachment to a jack.

The swivel connection enables the swivel jack assembly to pivot between an engaged upright position and a disengaged stowed position. The swivel connection comprises a pair of drawn cups, one cup integrally formed within each of the two brackets. Once properly aligned, the cups form a nesting relationship, one inside the other.

The swivel connection enables the jack to be easily pivoted between an active position and a stowed position. When in the active position, the jack extends vertically and can be used to raise or lower the tongue. After the tongue has been coupled to the towing vehicle, the jack can be repositioned into a stowed position. The swivel jack also includes a heavy-duty supporting caster wheel so that when the trailer is unhitched from the vehicle, the caster wheel facilitates movement of the trailer over the ground. The swivel jack assembly supports the tongue once the towing vehicle has been driven away.

The locking mechanism securely retains the jack-mounting bracket to the tongue-mounting bracket when the cup sections are nested together. The locking mechanism is in a secured position when the jack-bracket cup is nested within the tongue-bracket cup and the jack-mounting bracket is securely engaged to the tongue-mounting bracket in the upright engaged position.

For a more complete understanding of the swivel jack assembly of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE DRAWINGS

FIG. 1 discloses the preferred embodiment of the swivel jack assembly of the present invention mounted onto the side of a trailer tongue;

FIG. 2 discloses an assembly view of the swivel jack assembly of FIG. 1, the assembly including a jack-mounting bracket secured to a jack, a tongue-mounting bracket for secure retention onto a trailer tongue, the swivel jack assembly, and the fasteners;

FIG. 3 discloses a partial section view of the jack-mounting bracket of FIG. 1 secured to the jack;

FIG. 4A discloses an exploded view of the preferred embodiment of the swivel connection assembly of FIG. 1, comprising the pivotal connection of the jack-bracket cup and the tongue-bracket cup nested; and FIG. 4B discloses an exploded view of another embodiment of the swivel connection assembly, comprising the pivotal connection with the two cup sections separated by a spacer.

DETAILED DESCRIPTION OF THE PREFERRED EMBODIMENTS

The mounting for the swivel jack is rigid while enabling the jack to be easily pivoted between an active position and a stowed position. In the engaged position, the jack extends vertically upright and is used to raise or lower the tongue. After the tongue has been coupled to the towing vehicle, the jack is pivoted about a generally horizontal axis and moved to a stowed position in which the jack lies alongside the tongue.

Referring now to the drawings, FIGS. 1 and 2 disclose the preferred embodiment of the swivel jack assembly 10 of the present invention which comprises a tongue-mounting bracket 20, a jack-mounting bracket 30, a swivel connection 40, and a locking mechanism 50.

The tongue-mounting bracket 20 engages the tongue 21 of the trailer. The tongue-mounting bracket 20 has a substantially flat outer surface 22 with a pair of vertically disposed end flanges 24.

A pair of fasteners 25 are secured to the opposing corners of each end flange 24 for mounting to the trailer tongue 21.

The jack-mounting bracket 30 includes a pair of horizontal flanges 32 and 33 extending toward the jack, having semicircular recesses engaged in each flange to form a snug fit with the jack 31. The jack-mounting bracket 30 is affixed to the jack 31, preferably by welding. The jack-mounting bracket 30, likewise, has a substantially flat outer surface [32] for a generally back-to-back engagement with the tongue-mounting bracket 20.

The swivel connection is formed by a pair of drawn cups 27 and 37, generally centrally disposed in each bracket 20 and 30. Both cups 27 and 37 have a generally circular geometry enabling pivotal rotation of the jack-mounting bracket 30 relative to the tongue-mounting bracket 20. The tongue-bracket cup 27 has a centrally positioned aperture 28 and the jack-bracket cup 37 includes a generally centrally positioned orifice 38. In the preferred embodiment, the jack-bracket cup 37 has a generally convex shape for nesting engagement within the tongue-bracket cup 27, which has a generally concave shape. In another embodiment, the tongue-bracket cup 27 has a generally convex configuration for nesting within the jack-bracket cup 37 which has a generally concave configuration (not shown). In either arrangement, the jack-bracket orifice is in alignment with the tongue-bracket aperture when the brackets are nested together as the two brackets 20 and 30 rotate off the drawn cup.

The locking mechanism 50 has a released position and a secured position. When the swivel jack assembly of the present invention 10 is either in the engaged upright position or the disengaged stowed position, the locking mechanism 50 is secured. When the locking mechanism 50 is in the released position, the jack-mounting bracket 30 is free to pivotally rotate relative to the tongue-mounting bracket [30] *20*.

FIG. 4A discloses a first preferred embodiment of the [locking mechanism 50] *swivel connection 40* as shown in FIGS. 1 and 2. The [locking mechanism 50] *swivel connection 40* includes a bushing 51 having a hollow shank 52 and a bushing head 53. The bushing head 53 abuts the jack-mounting bracket 30, and the bushing shank 52 extends through the jack-bracket orifice 38. The [locking mechanism 50] *swivel connection 40* comprises a bushing 51, fastener 55, washer 58, and locknut 59. The powdered metal bushing 51 extends through the jack-bracket orifice 38. The fastener head 56 is accessible from the jack-mounting bracket 30. The fastener shank 57 extends through the bushing 51 and the tongue-bracket aperture 28. The washer 58 encircles the fastener shank 57, and abuts the tongue-mounting bracket 20. The locknut 59 is threadably mounted onto the fastener 55 opposite the fastener head 56. The locknut 59 is in cooperative engagement with the fastener head 56 to retain the jack-mounting bracket 30 to the tongue-mounting bracket 20.

In another preferred embodiment, as shown in FIG. 4B, the locking mechanism 50' comprises a fastener 53', spacer disc 51', and locknut 59'. The spacer disc 51' abuts the two brackets 20 and 30. The fastener shank 55' extends through the spacer disc 51', and the nut 59'. The fastener head [54'] *56'* is accessible from the jack-mounting bracket 30. The fastener shank 55 extends through the jack-mounting bracket 30 and the tongue-mounting bracket 20, and the locknut 59' is disposed on the fastener shank 55' opposite the fastener head [54'] *56'*. The spacer 51' maintans the jack-mounting bracket 30. Washers may be added where needed.

Preferably in either embodiment, in the engaged position, to prevent unwanted movement between the two brackets, the jack-mounting bracket 30 abuts the tongue-mounting bracket 20.

As shown in FIG. 3, the swivel jack assembly of the present invention 10 is locked in either a vertical or horizontal position by a spring loaded locking pin *64* that is mounted on the jack-mounting bracket 30 and is engageable within an opening in the tongue-mounting plate. Also, the wheel 66 has an 8-inch diameter and is attached to the jack 31 with a wheel yoke 67 that is embossed to withstand heavy loads.

The Patents referred to in this specification are for background purposes only, the complete specifications and drawings of which are incorporated herein by reference.

It is evident that many alternatives, modifications, and variations of the swivel jack assembly of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

[1. A swivel jack assembly for repositioning a trailer tongue, the swivel jack assembly comprising:

a tongue-mounting bracket for engagement onto a trailer tongue, the tongue-mounting bracket including a first cup section, the first cup section having an aperture;

a jack-mounting bracket including means for locking attachment to a jack, the jack-mounting bracket including a second cup section with an orifice disposed therethrough, the jack-mounting bracket orifice being in general alignment with the tongue-mounting bracket aperture when one of the cup sections is nested within the other cup section; and a locking mechanism for securely retaining the jack-mounting bracket to the tongue-mounting bracket when the cup sections are nested together, the locking mechanism including a shank extending through the jack-mounting bracket opening and the tongue-mounting bracket aperture, the shank having a released position and a secured position;

whereby the shank is in the released position when the tongue-mounting bracket pivotally rotates relative to the jack-mounting bracket from an upright engaged position to a stowed disengaged position, the shank is in the secured position when the cup sections are nested together and the jack-mounting bracket is securely engaged to the tongue-mounting bracket in the upright engaged position.]

[2. The swivel jack assembly of claim 1, wherein the shank is in the secured position when the jack-mounting bracket is secured in the stowed disengaged position.]

[3. The swivel jack assembly of claim 1, wherein the locking mechanism includes a bushing having a hollow shank and a bushing head, the bushing head abutting the jack-mounting bracket, the bushing shank extending through the orifice in the jack-mounting bracket.]

[4. The swivel jack assembly of claim 1, wherein the locking mechanism includes a spacer, the spacer preventing the jack-mounting bracket from abutting the tongue-mounting bracket.]

[5. The swivel jack assembly of claim 1, wherein the locking mechanism comprises a bushing extending through the orifice in the jack-mounting bracket, a fastener having a fastener head disposed onto one end of a shank, the fastener head being accessible from the jack-mounting bracket, the fastener shank extending through the bushing and the aperture in the tongue-mounting bracket, a washer encircling the fastener shank, the washer abutting the tongue-mounting bracket, and a locknut threadably mounted onto the fastener opposite the fastener head, the lockout being in cooperative engagement with the fastener head to retain the jack-mounting bracket to the tongue-mounting bracket.]

[6. The swivel jack assembly of claim 1, wherein the first cup section has a generally convex configuration and the second cup section has a generally concave configuration, the second cup section nesting within the first cup section.]

[7. A swivel jack assembly for repositioning a trailer tongue, the swivel jack assembly having an engaged position and a disengaged position, the swivel jack assembly comprising:

a tongue-mounting bracket for engagement with the trailer tongue, the tongue-mounting bracket including a first cup section, the first cup section having a generally convex configuration with an aperture disposed therethrough;

a jack-mounting bracket including means for locking attachment to a jack, the jack-mounting bracket including a second cup section with an orifice disposed therethrough, the jack-mounting bracket orifice being in general alignment with the tongue-mounting bracket aperture when one of the cup sections is nested within the other cup section; and a locking mechanism for securely retaining the jack-mounting bracket to the tongue-mounting bracket when the cup sections are nested together, the locking mechanism comprising a fastener, a bushing, a locknut, and a washer, the fastener having a fastener head and a fastener shank, the fastener shank extending through the bushing, the fastener head being accessible from the jack-mounting bracket, the bushing extending through the jack-mounting bracket, and the locknut being disposed on the shank opposite the fastener head;

whereby the shank is in the released position when the tongue-mounting bracket pivotally rotates relative to the jack-mounting bracket from an upright engaged position to a stowed disengaged position, and the shank is in the secured position when the cup sections are nested together and the jack-mounting bracket is securely engaged to the tongue-mounting bracket in the upright engaged position.]

[8. The swivel jack assembly of claim 7, wherein the shank is in the secured position when the jack-mounting bracket is secured in the stowed disengaged position.]

[9. The swivel jack assembly of claim 7, wherein the bushing has a hollow shank and a bushing head, the bushing head abutting the jack-mounting bracket, the bushing shank extending through the orifice in the jack-mounting bracket.]

[10. The swivel jack assembly of claim 7, wherein the first cup section has a generally convex configuration and the second cup section has a generally concave configuration, the second cup section nesting within the first cup section.]

[11. A swivel jack assembly for repositioning a trailer tongue, the swivel jack assembly comprising:

a tongue-mounting bracket for engagement onto a trailer tongue, the tongue-mounting bracket having an aperture;

a jack-mounting bracket for locking engagement with a jack, the jack-mounting bracket including means for locking attachment to a jack;

a swivel connection between the jack-mounting bracket and the tongue-mounting bracket, the swivel connection comprising a nesting engagement of a first cup section disposed within the tongue-mounting bracket and a second cup section disposed within the jack-mounting bracket, the jack-mounting bracket orifice being in alignment with the tongue-mounting bracket aperture when the cup sections are nested together; and a locking mechanism for securely retaining the jack-mounting bracket to the tongue-mounting bracket when the cup sections are nested together, the locking mechanism including a fastener shank and a bushing, the fastener shank extending through the jack-mounting bracket opening and the tongue-mounting bracket aperture, the bushing having a bushing shank and a bushing head, the bushing shank being hollow, the bushing head abutting the jack-mounting bracket, the bushing shank extending through the orifice in the jack-mounting bracket, the fastener shank extending through the bushing shank and being in a released position when the tongue-mounting bracket pivotally rotates relative to the jack-mounting bracket from an upright engaged position to a stowed disengaged position, and the shank being in a secured position when the cup sections are nested together and the jack-mounting bracket is securely engaged to the tongue-mounting bracket in the upright engaged position.]

[12. The swivel jack assembly of claim 11, wherein the shank is in the secured position when the jack-mounting bracket is secured in the stowed disengaged position.]

[13. The swivel jack assembly of claim 11, wherein the locking mechanism further comprises a bushing extending through the orifice in the jack-mounting bracket, a fastener having a fastener head disposed onto one end of a shank, the fastener head being accessible from the jack-mounting bracket, the fastener shank extending through the bushing and the aperture in the tongue-mounting bracket, a washer encircling the fastener shank, the washer abutting the tongue-mounting bracket, and a locknut threadably mounted onto the fastener opposite the fastener head, the locknut being in cooperative engagement with the fastener head to retain the jack-mounting bracket to the tongue-mounting bracket.]

[14. The swivel jack assembly of claim 11, wherein the first cup section has a generally convex configuration and the second cup section has a generally concave configuration, the second cup section nesting within the first cup section.]

*15. A swivel jack assembly for raising and lowering a trailer, said swivel jack assembly comprising:*

*a jack having an outer housing;*

*a first mounting bracket connected to said jack housing;*

*a second mounting bracket connected to said trailer; and*

*a swivel connection for permitting rotational movement of said first mounting bracket relative to said second mounting bracket, the swivel connection comprising a pair of elements at least partially engaged with each other, wherein one element is a protrusion integrally formed with and extending from one of said first and said second mounting brackets and the second element is a recess disposed within the other one of said first and said second mounting brackets,*

*wherein the protrusion extends into and engages with an internal surface of the recess and rotational movement between said protrusion and said recess is permitted during engagement whereby the protrusion engaging with the internal surface of the recess forms nesting cups.*

*16. The swivel jack assembly of claim 15 wherein said first mounting bracket is permanently secured to the jack housing and said second mounting bracket is removably connectable to the trailer.*

*17. The swivel jack assembly of claim 15 wherein the protrusion has a first centered aperture therethrough and the recess has a second centered aperture therethrough.*

*18. The swivel jack assembly of claim 15 wherein the swivel connection further comprises a bolt and a nut, the bolt attaching the first mounting bracket to the second mounting bracket through a first centered aperture in the protrusion and a second centered aperture in the recess.*

*19. The swivel jack assembly of claim 18 wherein the swivel connection further comprises a bushing, the bushing extending through at least the aperture in the first mounting bracket.*

*20. The swivel jack assembly of claim 19, wherein the bushing further includes a head for abutting against the first mounting bracket.*

*21. The swivel jack assembly of claim 15 wherein the protrusion is cup-shaped and generally circular in cross-section.*

*22. The swivel jack assembly of claim 21 wherein the recess is cup-shaped and generally circular in cross-section.*

*23. The swivel jack assembly of claim 22, wherein the recess includes a peripheral wall that is substantially continuous and the protrusion includes a peripheral wall that is substantially continuous.*

*24. The swivel jack assembly of claim 15 further comprising means for selectively locking the jack into a vertical position and a horizontal position.*

*25. The swivel jack assembly of claim 15 wherein the protrusion is a generally centrally disposed convex cup within the first mounting bracket.*

*26. A swivel jack assembly for mounting to a trailer, comprising:*

*a jack;*

*a jack-mounting bracket;*

*a trailer mounting bracket;*

*a swivel connection for permitting rotational movement of said jack-mounting bracket relative to said trailer mounting bracket, the swivel connection including a pair of axially aligned apertures and a fastener extending therethrough, the first aperture in the jack mounting bracket and the second aperture in the trailer mounting bracket, the jack mounting bracket including an integrally formed and generally protruding member extending therefrom and having the first aperture centrally located therethrough; and*

*a second protruding member extending from the trailer mounting bracket and having the second aperture centered therethrough, wherein engagement of the first protruding member with the second protruding member forms nesting cups.*

*27. The swivel jack assembly of claim 26, further comprising a bushing, the bushing extending through the first aperture.*

*28. The swivel jack assembly of claim 27 wherein the bushing has a bushing head abutting the jack mounting bracket.*

*29. The swivel jack assembly of claim 26 wherein the protruding member is generally circular in cross-section.*

*30. The swivel jack assembly of claim 29 wherein the second protruding member is generally circular in cross-section the protruding members together with the fastener, enable pivotal rotation of the jack mounting bracket with respect to the trailer mounting bracket.*

*31. The swivel jack assembly of claim 30 wherein the protruding members are cup sections and are each integral with a respective one of the jack and the trailer mounting brackets.*

*32. The swivel jack assembly of claim 31, wherein the protruding members each include a peripheral wall that is substantially continuous.*

*33. The swivel jack assembly of claim 30, wherein an exterior surface of one of said first and second protruding members engages an interior surface of the other of said first and second protruding members.*

*34. The swivel jack assembly of claim 26 further including a wheel yoke and a wheel, the wheel yoke attached to an end of the jack.*

*35. The swivel jack assembly of claim 26 further including means for selectively locking the jack in a vertical position and a horizontal stowed position.*

*36. The swivel jack assembly of claim 26, wherein the generally protruding member extends from the jack mounting bracket toward the trailer mounting bracket.*

*37. A swivel jack assembly of the type having a jack, a jack-mounting bracket, a trailer frame mounting bracket, a spring-loaded locking pin, and a swivel connection having a bolt connecting the jack mounting bracket and the trailer frame mounting bracket and enabling the jack mounting*

*bracket to pivotally rotate with respect to the trailer frame mounting bracket, wherein the improvement comprises a pair of nesting cups,*

*the first cup having a first centered bolt hole and disposed in the jack-mounting bracket and the second cup having a second centered bolt hole axially aligned with the first bolt hole and disposed in the trailer frame mounting bracket.*

*38. The swivel jack assembly of claim 37 wherein the swivel connection further includes a bushing having a bushing shank extending through the first bolt hole.*

*39. The swivel jack assembly of claim 37, wherein the pair of nesting cups each include a peripheral wall that is substantially continuous.*

* * * * *